Figure 4:
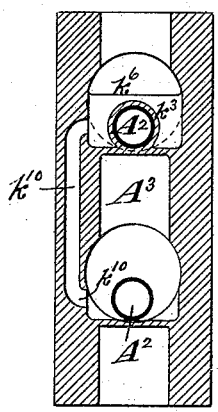

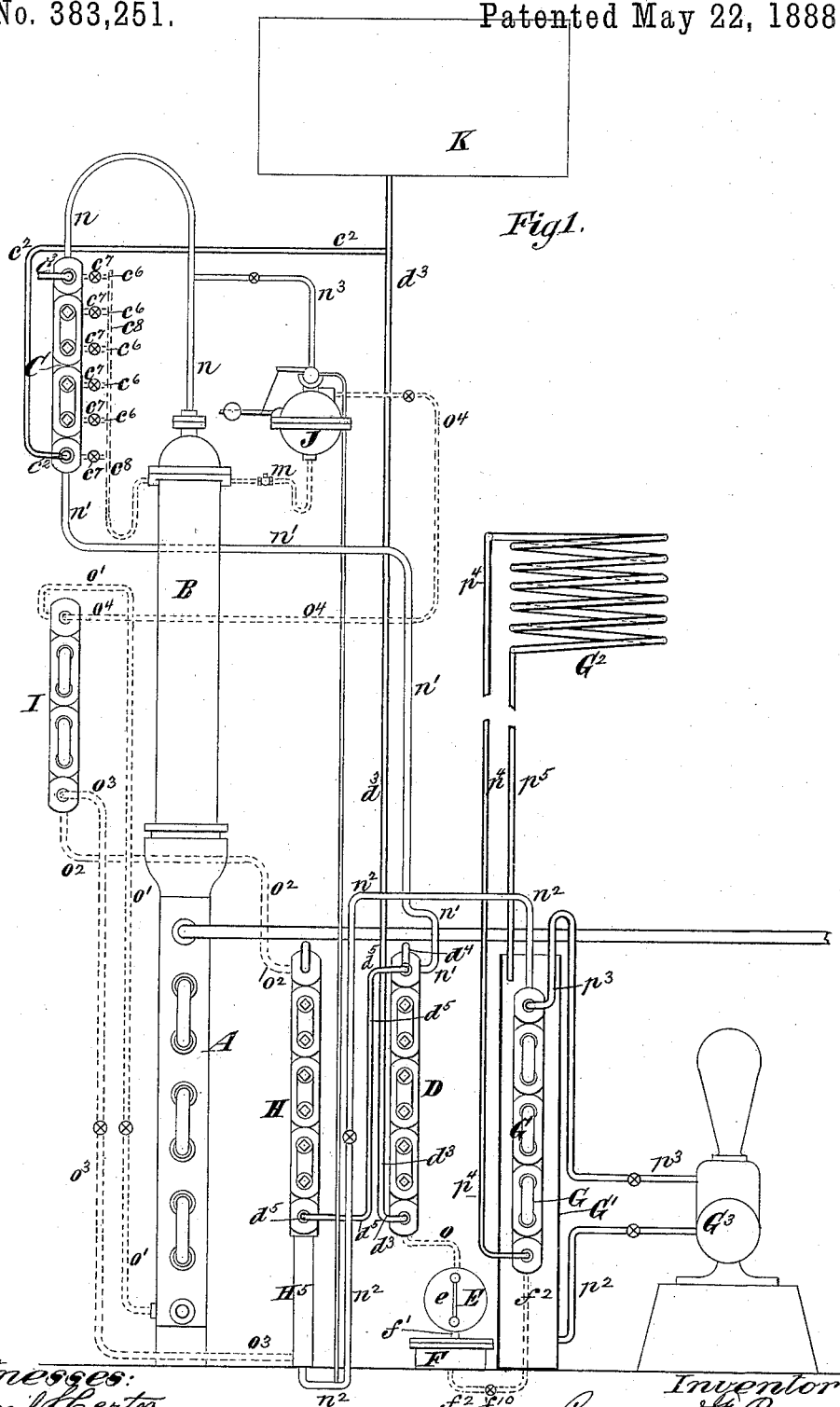

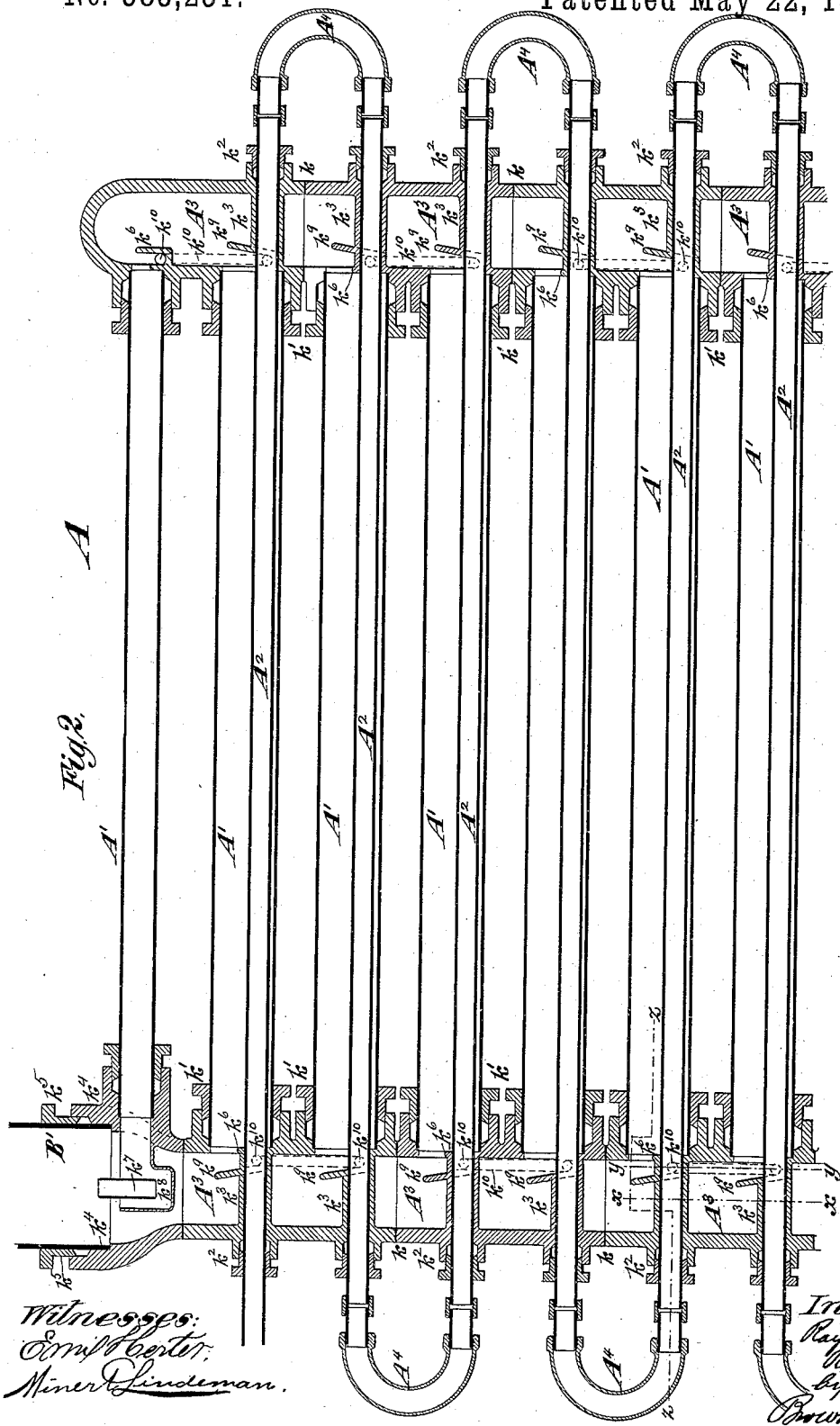

(No Model.) 9 Sheets—Sheet 3.

R. F. ROSWALD.
APPARATUS FOR REFRIGERATING AND ICE MAKING BY THE USE OF AMMONIA.

No. 383,251. Patented May 22, 1888.

Witnesses:
Emil Berter
Miner Hindeman

Inventor:
Raymond F. Roswald
by his Attys
Brown & Hall

N. PETERS, Photo-Lithographer, Washington, D. C.

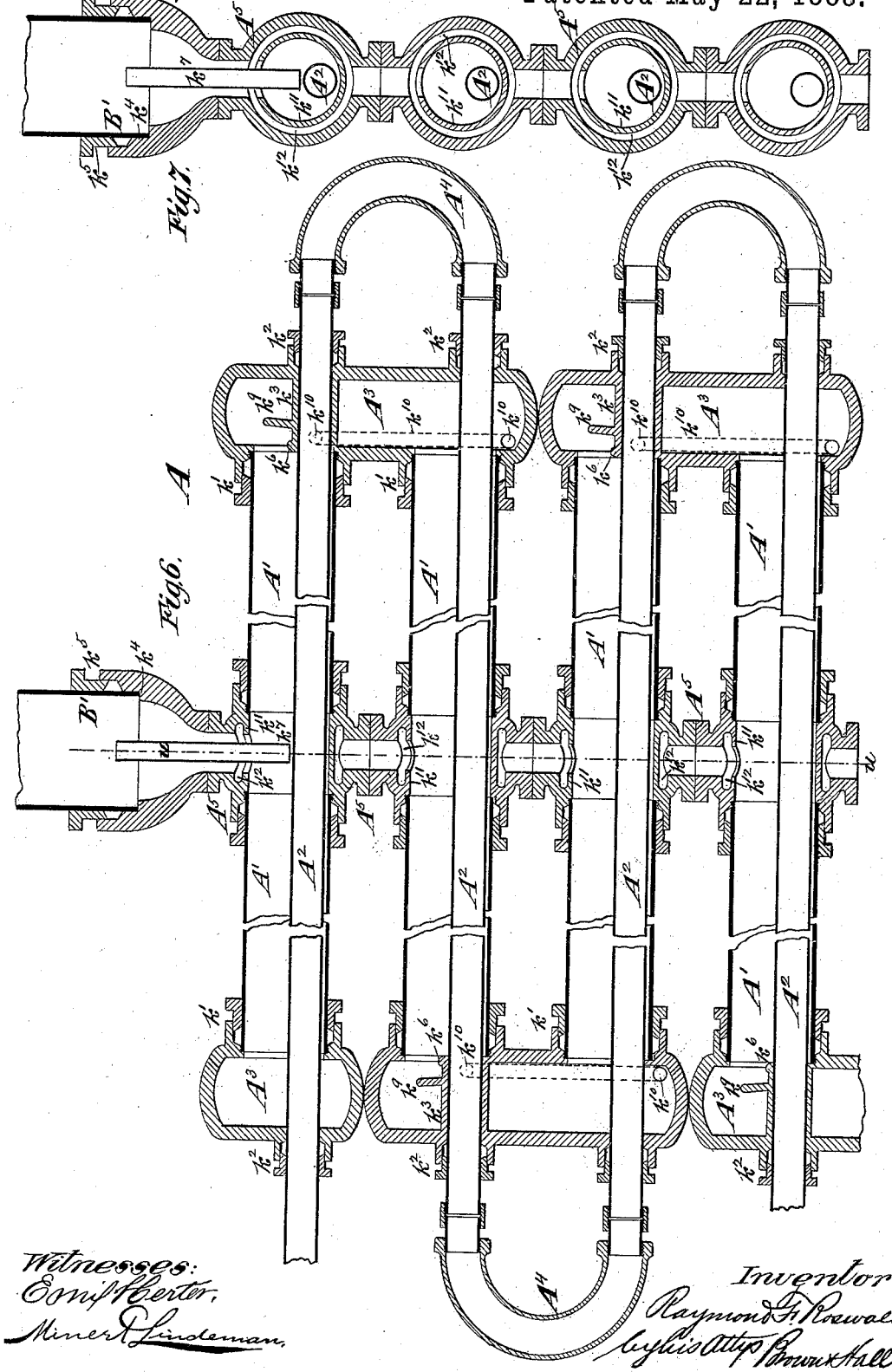

(No Model.) 9 Sheets—Sheet 5.
R. F. ROSWALD.
APPARATUS FOR REFRIGERATING AND ICE MAKING BY THE USE OF AMMONIA.
No. 383,251. Patented May 22, 1888.
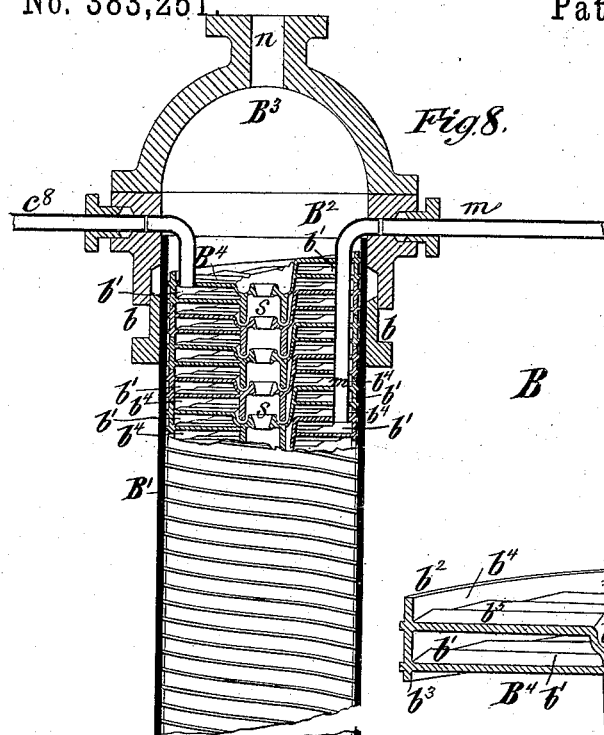
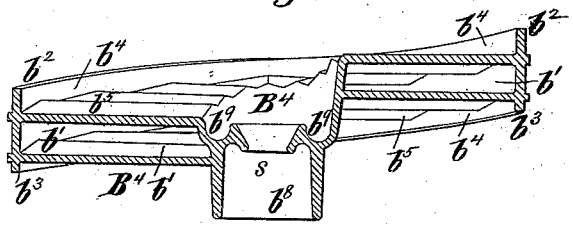
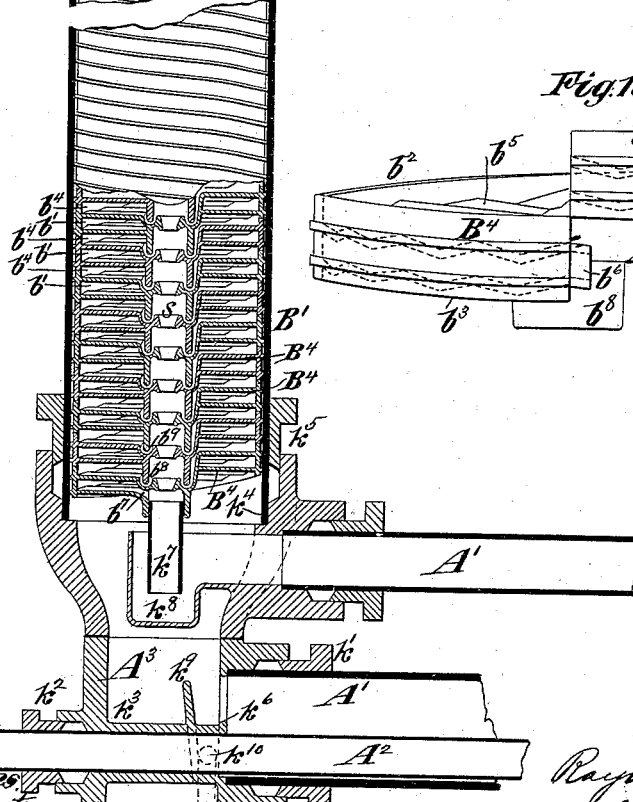

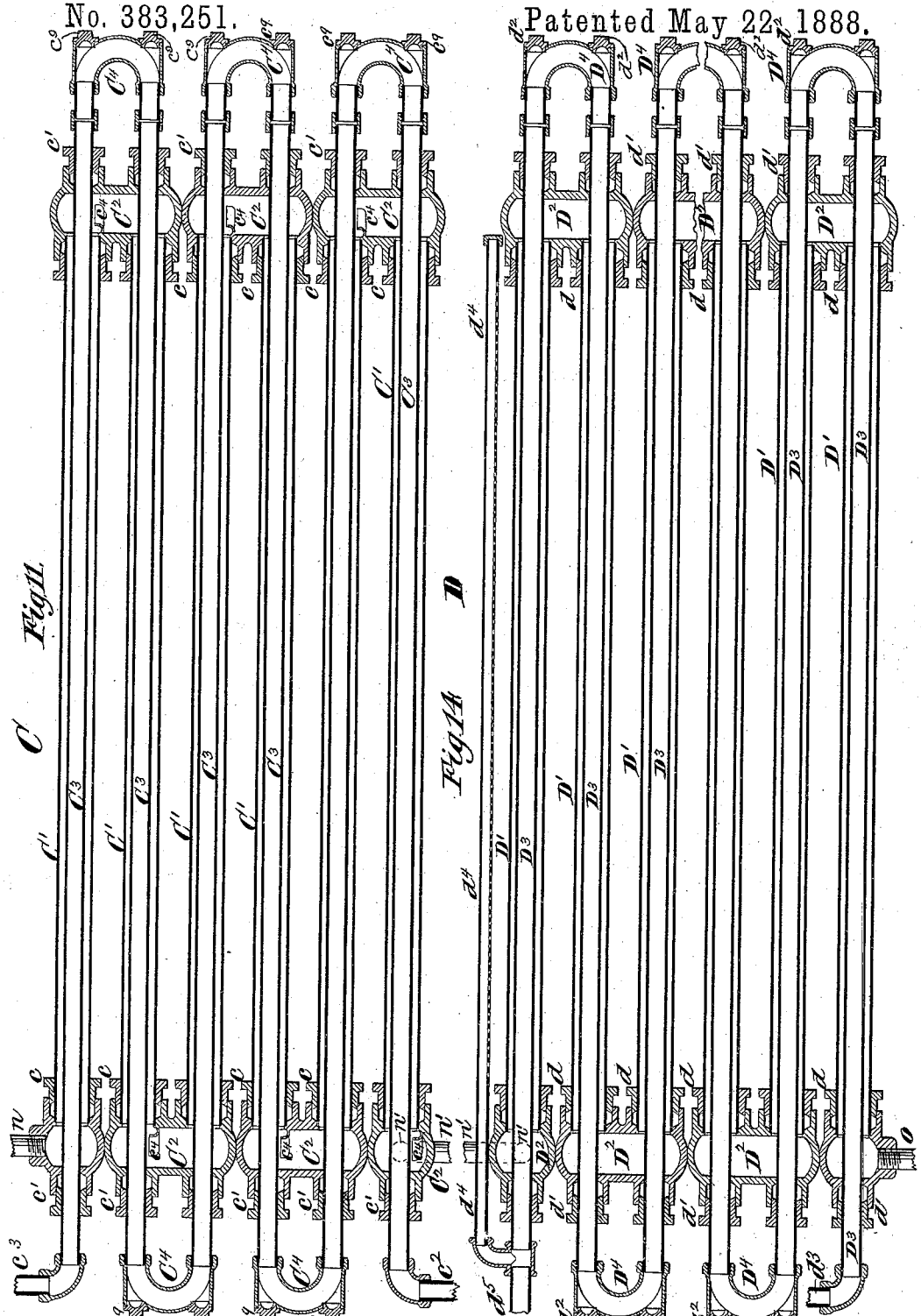

(No Model.) 9 Sheets—Sheet 7.
R. F. ROSWALD.
APPARATUS FOR REFRIGERATING AND ICE MAKING BY THE USE OF AMMONIA.
No. 383,251. Patented May 22, 1888.
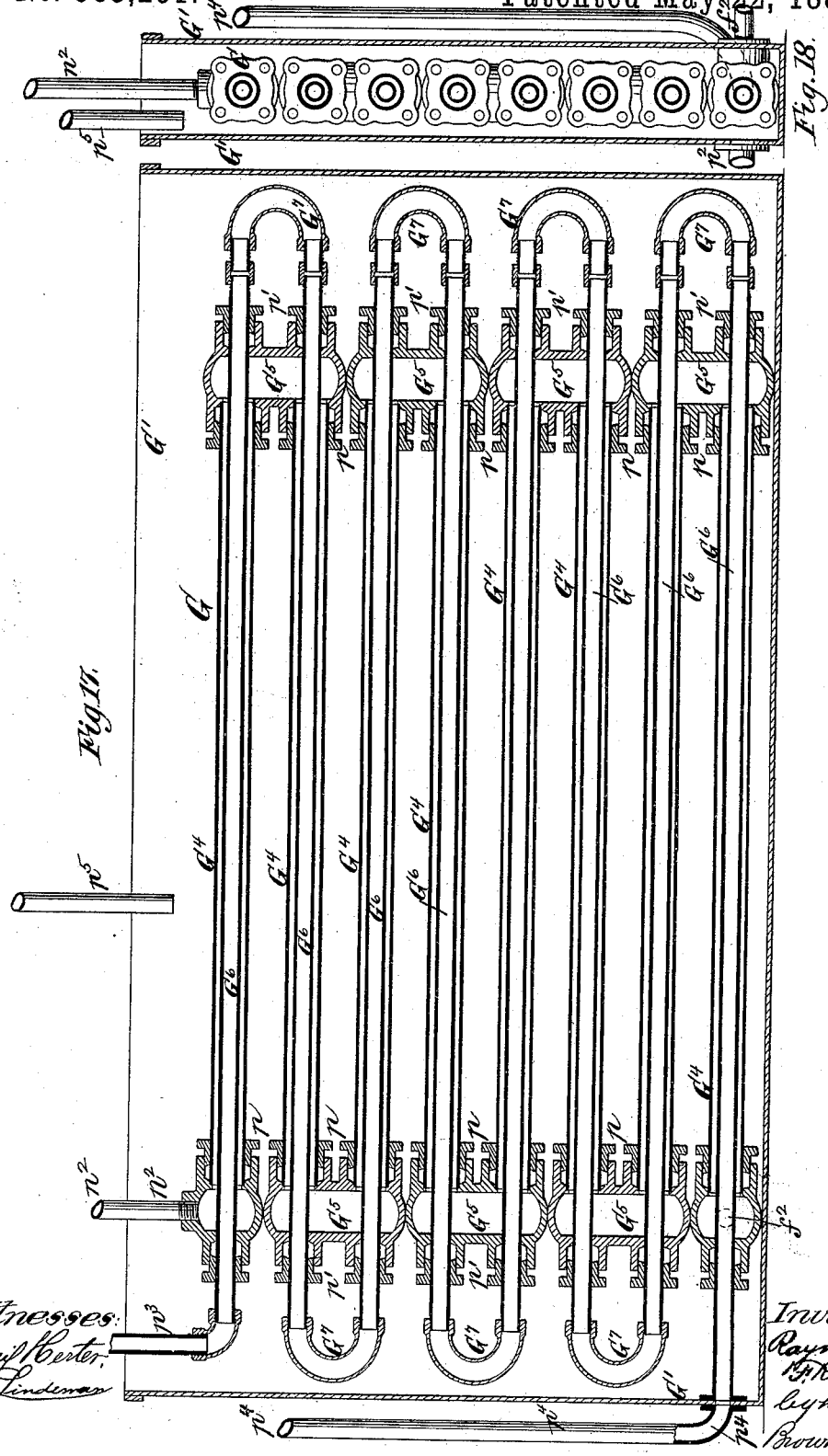

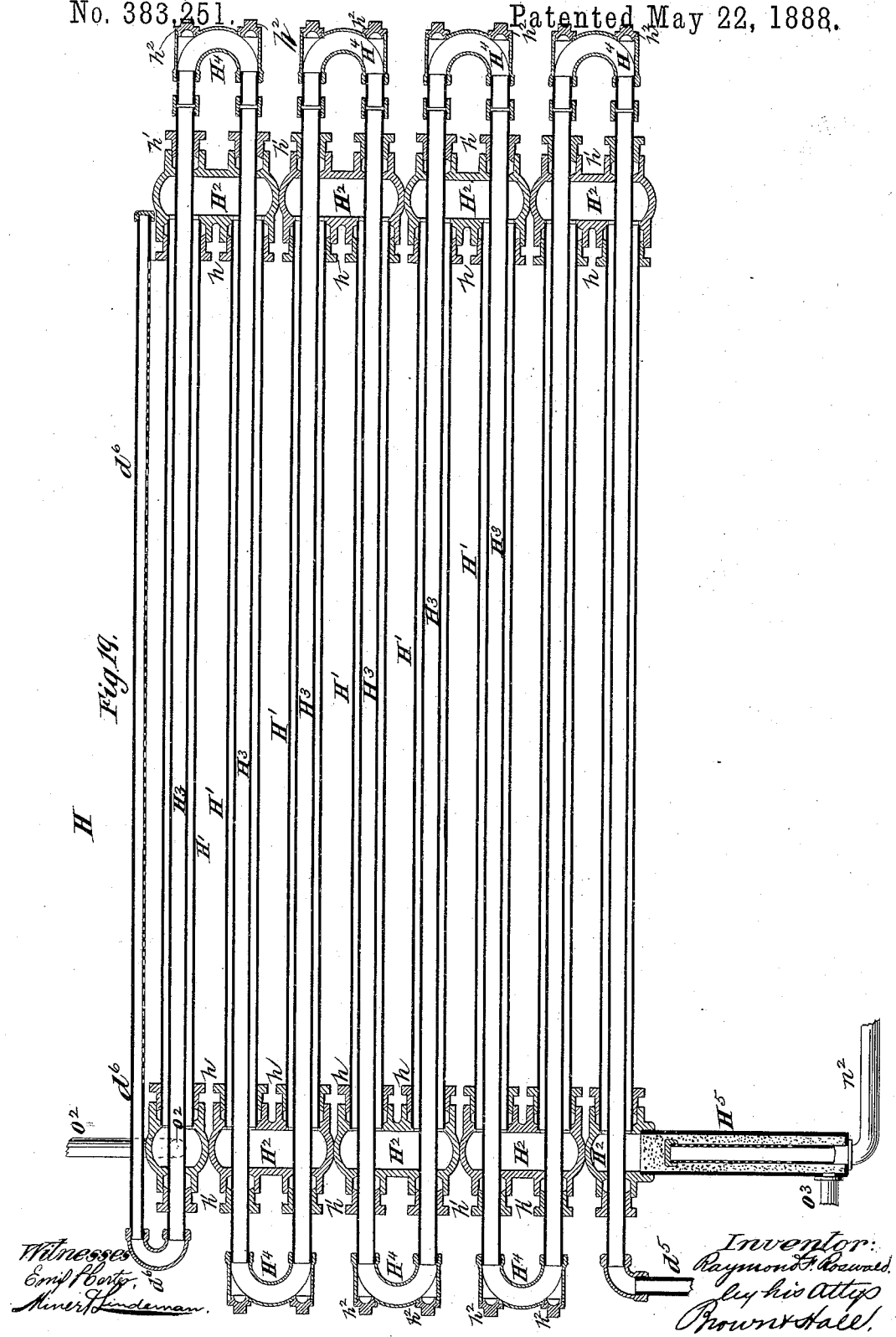

(No Model.) 9 Sheets—Sheet 9.
R. F. ROSWALD.
APPARATUS FOR REFRIGERATING AND ICE MAKING BY THE USE OF AMMONIA.
No. 383,251. Patented May 22, 1888.
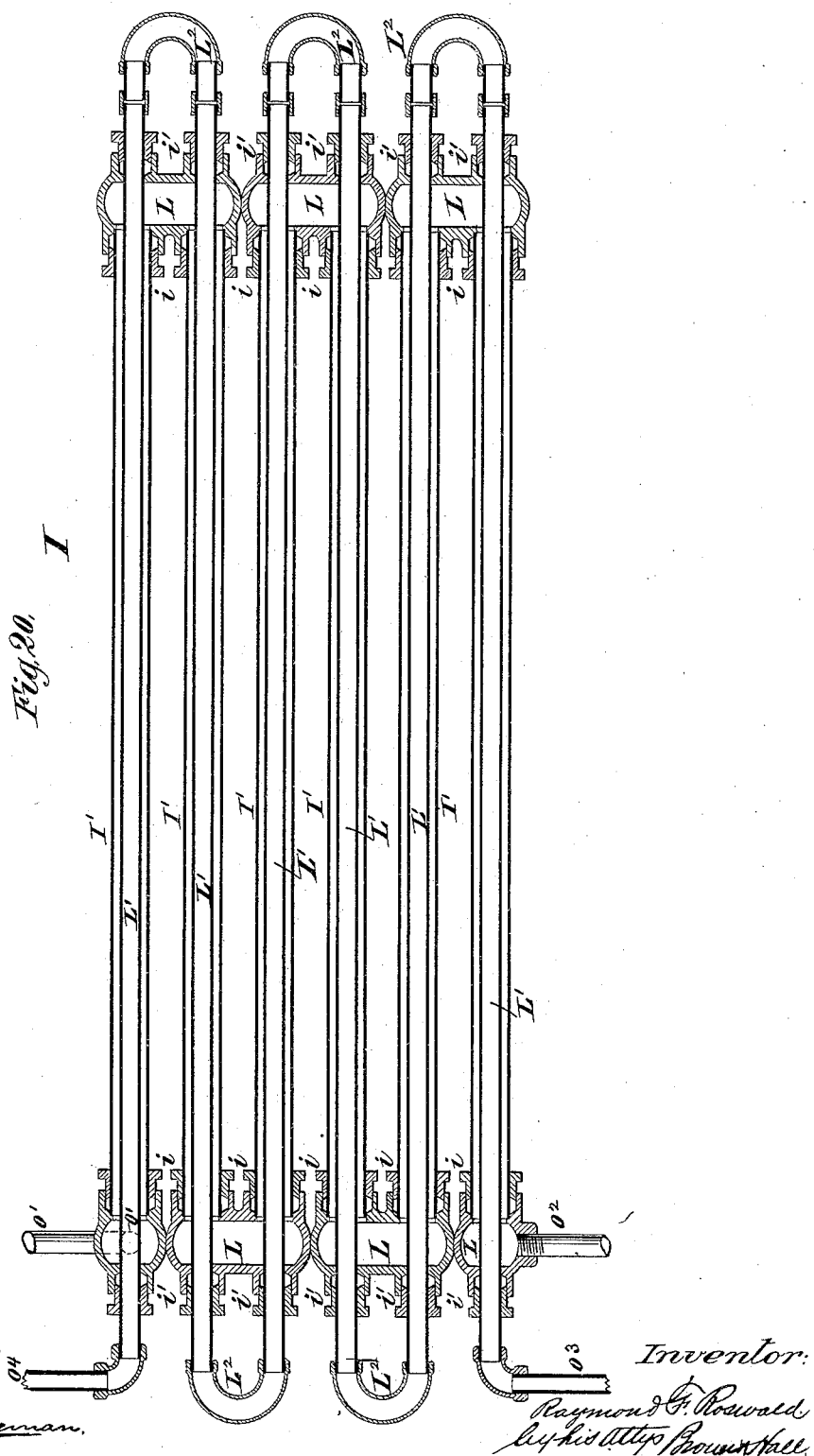

under stars patent office.

RAYMOND F. ROSWALD, OF NEW YORK, N. Y.

APPARATUS FOR REFRIGERATING AND ICE-MAKING BY THE USE OF AMMONIA.

SPECIFICATION forming part of Letters Patent No. 383,251, dated May 22, 1888.

Application filed July 16, 1886. Serial No. 208,223. (No model.)

*To all whom it may concern:*

Be it known that I, RAYMOND F. ROSWALD, of the city and county of New York, in the State of New York, have invented a new and useful Improvement in Apparatus for Refrigerating and Ice-Making by the Use of Ammonia, of which the following is a specification.

My invention relates to the class of apparatus in which ammonia gas is generated by heat from aqua ammonia and in which the gas, after being condensed or reduced to a liquid form by pressure and cooling in a condenser, is permitted to expand into a gaseous form, and thereby to absorb or render latent the heat from brine or other liquid which it is desired to cool. In the following specification I shall, for the sake of convenience, refer to the aqua-ammonia before gas is generated therefrom as "strong liquor" and the liquor from which the gas has been driven off by heat as "weak liquor," and I shall refer to the gas after it has performed its useful effect by expansion in the cooler and before it has been reabsorbed by the weak liquor as "spent gas." In apparatus of this class the ammoniacal liquor has a strong affinity for the gas and will absorb it greedily, especially if the liquor be at a less temperature than the gas; and in order to obtain the full measure of economy in the working of the apparatus it is advantageous to maintain gas after being generated and before it reaches the cooler, wherein it performs its useful effect, out of contact with the ammoniacal liquor, and to thus prevent any absorption of the gas after generation and before it performs its useful effect in the cooler. It is also necessary in order to obtain the lowest possible temperature in the cooler and to secure economy in operation that the gas before it passes to the cooler shall be caused to deposit, as far as is possible, its aqueous vapor, which is unavoidably generated with it, and be brought to a nearly anhydrous condition. The power of the weak liquor to absorb the spent gas is increased according as the weak liquor is lowered in temperature, and the economy of the apparatus may be increased by causing the interchange of heat between the strong liquor as it passes to the generator and the weak liquor as it passes to the absorber, whereby the strong liquor will be heated preparatory to its introduction in the generator and the weak liquor will be cooled in its passage to the absorber, and will thereby absorb more readily the spent gas. It is also of great importance in apparatus of this class that ample provision be afforded for readily cleaning the water-passages of the condenser and absorber from any mud or foreign matter which may deposit therein by the cooling-water, as the efficiency of such portions of the apparatus depends greatly on the metallic surfaces through which heat is transmitted being kept clean.

My improved apparatus in its most complete form comprises a generator wherein the strong liquor is subjected to the heat of steam in order to generate gas therefrom; also, an analyzer or separator through which the strong liquor passes to the generator and through which the gas passes from the generator, and by the operation of which the rectification of the gas is performed, whereby it is freed from a large proportion of the aqueous vapor which it contains; also, a rectifier wherein the gas is freed from nearly all of the remainder of aqueous vapor which it contains and in which the rectification of the gas can be readily controlled by the operator, so as to free it from nearly all water; also, a condenser wherein the gas is subjected to the action of cooling-water and by the combined action of cooling and pressure is condensed into liquid form; also, a receiver for the condensed gas from the condenser and a float-actuated valve which controls the passage of the condensed gas; also, a cooler wherein the condensed gas is permitted to expand, and thereby to absorb or render latent the heat in brine or other fluid which it is desired to cool; also, an absorber to which are supplied the weak liquor after gas has been generated therefrom and the spent gas from the cooler, and in which the spent gas is absorbed by the weak liquor, so as to produce strong liquor; also, an equalizer through which the strong liquor and the weak liquor are caused to flow in passages separated by metal contact-walls, and in which the strong liquor abstracts heat from the weak liquor, whereby the strong liquor is raised in temperature prior to its introduction into the generator and the weak liquor cooled, so that it will have greater affinity for the spent gas in passing through the absorber; also, an automatic trap whereby the strong liquor under a slight pressure is delivered to the generator, wherein there is a comparatively heavy pressure, the said trap being supplied with gas as an equalizing agent.

The invention consists in certain novel features of construction and combinations of parts in the several devices above referred to, which are hereinafter described, and pointed out in the claims.

Figure 3:
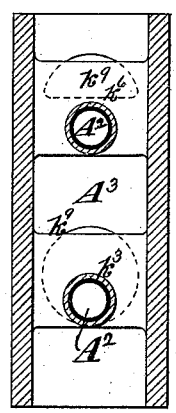
Figure 5:
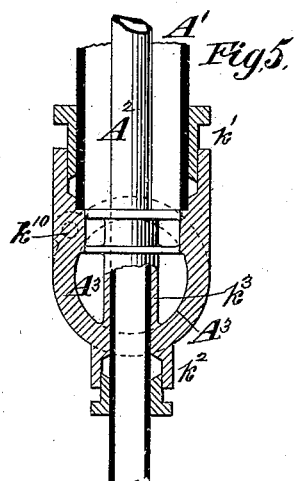
Figure 12:
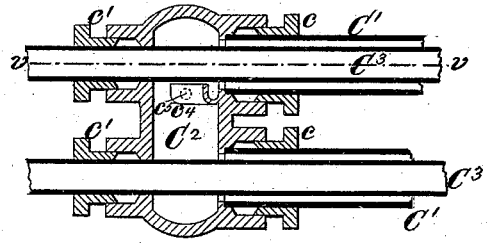
Figure 13:
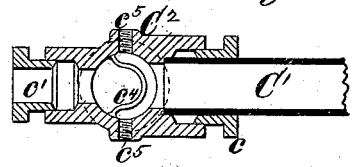
Figure 15:
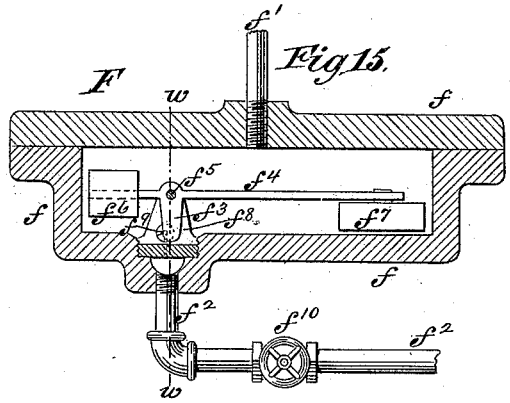
Figure 16:
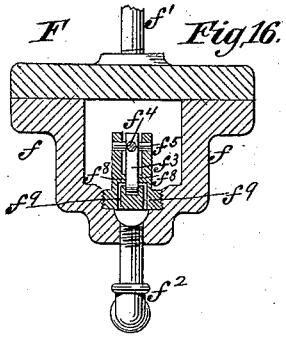

In the accompanying drawings, Figure 1 is an elevation showing all the parts or elements of my apparatus suitably connected for operation. Fig. 2 is a sectional elevation of the generator upon a larger scale. Fig. 3 is a transverse section of a portion of the generator upon the plane of the dotted line $x\ x$, Fig. 2, and upon a larger scale. Fig. 4 is a similar section on the plane of the dotted line $y\ y$, Fig. 2, and upon the same scale as Fig. 3. Fig. 5 is a horizontal section, also upon the same large scale and upon the plane indicated by the irregular dotted line $z\ z$, Fig. 2. Fig. 6 is a sectional elevation of a generator of modified form also embodying my invention. Fig. 7 is a transverse section upon the plane of the dotted line $u\ u$, Fig. 6. Fig. 8 is a sectional elevation of the analyzer or separator and a portion of the generator which supports it. Figs. 9 and 10 are respectively a transverse section and side view of one of the cast-metal sections employed in the analyzer or separator, showing them upon a larger scale than Fig. 8. Fig. 11 is a sectional elevation of the rectifier employed in connection with the analyzer or separator to free the gas from aqueous vapor. Fig. 12 is a vertical section of a portion of the rectifier upon a larger scale than Fig. 11. Fig. 13 is a horizontal section of a portion of the rectifier upon the plane of the dotted line $v\ v$, Fig. 12. Fig. 14 is a sectional elevation of the upper and lower portions of the condenser, the middle portion being removed in order to reduce the height of the drawing. Fig. 15 is a sectional elevation of the automatic float-actuated valve which controls the flow of liquid gas from the condenser to the cooler. Fig. 16 is a sectional view of such valve upon the plane of the dotted line $w\ w$, Fig. 15. Fig. 17 is a longitudinal sectional elevation of the cooler, and Fig. 18 is a transverse sectional elevation thereof. Fig. 19 is a sectional elevation of the absorber, and Fig. 20 is a sectional elevation of the equalizer.

In all the figures of the drawings similar letters of reference designate corresponding parts; but in the general view, Fig. 1, I have represented each of the elements of my apparatus by a single letter of reference, while in the remaining figures other letters are employed to designate the several parts of each element.

In Fig. 1 such pipes as serve for the flow of ammonia-gas are represented by light and full double lines, the pipes which serve for the passage of liquid ammonia are represented by double dotted lines, and the pipes which serve for the flow of water, steam, and brine are represented by heavy double full lines.

Referring first to Fig. 1, A designates the generator, wherein gas is generated from the strong liquor by the heat of steam. B designates the analyzer or separator, which is shown as mouted upon the generator, and through which the gas leaves the generator and the strong liquor enters the generator. C designates the rectifier, wherein the gas is freed from nearly all of the aqueous vapor which it has after leaving the analyzer or separator B. D designates the condenser, wherein the gas is condensed by cooling and pressure to a liquid form. E designates the receiver for liquid gas. F designates the automatic float-actuated valve for controlling the flow of liquid gas to the cooler. G designates the cooler proper, and G' the tank for brine or other liquid in which the cooler is arranged. $G^2$ is a representation of a cooling-coil, which may be arranged in a cellar or other apartment to be cooled, and $G^3$ designates a pump whereby the circulation of brine or other liquid through the cooler, the tank, and the coil $G^2$ is produced. H designates the absorber, wherein the spent gas is brought in contact with and absorbed by the weak liquor. I designates the equalizer, wherein the strong liquor absorbs heat from the weak liquor, and J designates an automatic trap, whereby the strong liquor is automatically delivered to the analyzer or separator B, and through it is returned to the generator.

I will first describe the construction of the generator A, which is shown in Figs. 2, 3, 4, and 5. The generator comprises a series of outer tubes, A', for strong liquor, and a series of inner tubes, $A^2$, extending through the outer tubes and serving for the passage of steam. The outer tubes A' extend from headers $A^3$, which may be made each in one piece for the entire height of the generator, or which may be made in sections, as shown in Fig. 2, connected by suitable joints, $k$. The outer tubes A' are fitted to stuffing-boxes $k'$ on the headers $A^3$, and the inner tubes $A^2$, for steam, extend beyond the headers, and are connected by return-bends $A^4$, so as to provide for the flow of steam continuously through the system of inner tubes and bends. I have represented the inner tubes as arranged very near the bottom of the outer tubes A' and eccentric thereto, and the inner tubes $A^2$, which are smaller and lighter, are in reality supported on the bottom surface of the outer tubes A'. Inasmuch as the metal in the section of the tubes A' $A^2$ in Fig. 2 is represented by heavy black lines, the drawing would not be clear if the lower line of the tubes $A^2$ were merged into the lower line of the tubes A'. I have therefore shown these heavy lines as separated by a minute space; but the fact remains that it is my intention usually to support the tubes $A^2$ upon the bottom of the tubes A'. The advantages of this eccentric arrangement of the inner tubes are that the inner tubes are prevented from sagging downward to such an extent as to accumulate water of condensation in them, and thereby oppose an obstruction to the free flow of steam, and a quantity of strong liquor which will about half fill the outer tubes A' will enable the whole surface of the inner tubes to be effective for heating, and will still afford ample space in the outer tubes for the free passage of gas above the strong liquor. The inner tubes extend through stuffing-boxes $k^2$ in the outer walls of the headers $A^3$, and the headers have in them cored passages or hollow bridges $k^3$ for the passage of the inner tubes $A^2$. The top portion of the header $A^3$ at one end of the generator should be constructed to form a socket, $k^4$, for the reception of the lower end of the analyzer or separator chamber or casing B', which is fitted to a stuffing-box, $k^5$, as shown in Fig. 2. It is my intention to maintain in the several outer tubes A' a quantity of strong liquor to about one-half their diameter, and this is controlled by dams $k^6$, formed in the headers at the ends of the outer tubes A' and over which the strong liquor will flow after reaching the proper depth in the tube to the tube below, and so on throughout the series. The strong liquor is received into the generator through a pipe or nipple, $k^7$, which has a liquid seal within a cup, $k^8$, and from the opposite end of the upper tube A' liquid overflows to the next tube A' below at the corresponding end, and from the opposite end of the lower tube liquid overflows over the dam $k^6$.

The gas which is generated from the strong liquor in the several outer tubes A' has a free escape to the header $A^3$, on which is the analyzer or separator B, and after the gas once escapes into this header it comes no more in contact with the strong liquor overflowing from the several tubes A' or entering the generator, and hence no opportunity is afforded for the absorption of the gas after being once generated until it has performed its useful effect. In addition to the dams $k^6$, I have shown other and higher dams, $k^9$, whereby the strong liquor when undergoing ebullition is prevented from boiling over, so as to fall through the gas-space of the headers $A^3$, and in the headers $A^3$ are constructed cored passages $k^{10}$, as best shown in Fig. 4, which have no communication with the gas-space of the headers and through which the strong liquor overflowing the dam $k^6$ at the end of any tube A' is delivered to the next outer tube A' below. In this way the strong liquor passes from one to another of the outer tubes A' without coming in contact with the gas escaping from the headers $A^3$, and the entering volume of gas from the generator passes upward into the casing or chamber B' of the analyzer or separator B.

In Figs. 6 and 7 I have shown a modification of the generator, in which there is a central header, $A^5$, from which outer tubes A', for strong liquor, extend in opposite directions, and which is composed of sections superposed one on another. The outer tubes A' at their remote ends are joined by headers $A^3$, constructed with dams $k^6$ $k^9$ and cored passages $k^{10}$ for the passage of strong liquor from one outer tube to the next below, as above described. The outer tubes A', which extend in opposite directions from the central header, $A^5$, form practically one outer tube, and the inner tubes $A^2$, for steam, are continuous from end to end of the generator and are united by bends $A^4$, as above described. The sections of the central header, $A^5$, are constructed with inner jackets or linings, $k^{11}$, forming practically continuations of the tubes A' and forming annular spaces $k^{12}$, through which the gas rising in the header $A^5$ is conducted around and afforded a free passage upward to the chamber of casing B' of the analyzer without coming in contact with the strong liquor in the tubes A' and in the sections of the header $A^5$. This central header, $A^5$, is constructed with a socket, $k^4$, and stuffing-box $k^5$ to receive the chamber or casing B' of the analyzer, as described with reference to Fig. 2.

I will now particularly describe the construction of the analyzer or separator B, which is shown in Figs. 8, 9, and 10. The chamber or casing may consist of a straight pipe or large tube, B', connected at the bottom with the header of the generator, as described, and fitting at the top in a stuffing-box, $b$, in the upper cast-metal section, $B^2$, surmounted by a head, $B^3$. The analyzer or separator is constructed with two contiguous but separate passages of great extent, through one of which gas flows upward from the generator, and through the other of which strong liquor flows downward to the generator. As here represented, these contiguous and separate passages are formed by cast-metal sections $B^4$, the construction of which will be best understood from Figs. 9 and 10, and which are placed one above another in the chamber or casing B'. Each of these cast-metal sections forms a portion of a spiral or screw-thread and has an inner space, $b'$, and flanges $b^2$ $b^3$ at top and bottom. When the sections $B^4$ are arranged one above another in the chamber or casing B', they form two contiguous but separate spiral passages, $b'$ $b^4$, the passage $b'$ being formed in the sections and the passage $b^4$ being formed between the sections. In this example of the invention the passage $b^4$, formed between the several spiral sections $B^4$, serves for the flow of gas upward from the generator, while the passage $b'$, which is formed in the several sections $B^4$, serves to conduct strong liquor downward to the generator. I have here represented the several partitions made in the sections $B^4$ to separate the passages $b'$ $b^4$ as having ribbed, zigzag, or serpentine profile, as shown at $b^5$, in order to increase the amount of surface over which the gas and strong liquor flow.

In order to prevent the leakage of strong liquor downward from the passage $b'$ in its flow from one section to another, I have shown each section $B^4$ as having at its lower end a lip, $b^6$, which forms a continuation of the passage $b'$, and which enters a recess or mouth in the upper end of the next section below, thereby forming a lap-joint. The strong liquor is supplied to the separator near the upper end of the spiral passage $b'$ by a pipe, $m$, which is continued down through several of the sections $B^4$, for a purpose hereinafter described, and from the bottom section $B^4$ the strong liquor is conducted through a port or passage, $b^7$, from the lower end of the passage $b'$, and is delivered by a pipe or nipple, $k^7$, into the generator.

Each of the sections $B^4$ is constructed with a downwardly-projecting throat or nipple, $b^8$, which, when the sections are arranged one above another, is received in the annular recess or groove $b^9$ in the next lower section, and thereby forms a seal or trap which prevents the escape of gas at any point from the passage $b^4$ into the opening through the center of the sections $B^4$. The upper partitions which form the top of each of the sections $B^4$ are inclined slightly toward the center and toward the recess or seal $b^9$, so that any water deposited from the gas will tend to flow to the center, and, after passing the seal $b^8$ $b^9$, will flow downward through the center of the sections into the generator.

The gas as it passes upward through the spiral passage $b^4$ imparts its heat to the strong liquor which descends through the spiral passage $b'$, thereby heating the strong liquor before its entrance to the generator, as is desirable, and cooling the gas, in order that the latter shall deposit in its passage upward through the analyzer or separator a large proportion of the aqueous vapor which it holds in suspension, and which would prevent it, if retained, from performing its maximum useful effect.

It will be observed that, although proper provision is made in the analyzer or separator B for cooling the gas and causing it to deposit aqueous vapor in the form of water, the gas does not at any time during its passage through the analyzer come in contact with the strong liquor, and hence no part of the gas is lost in absorption.

In some cases the analyzer or separator, such as I have described, or one of other form in which the contiguous passages for gas and strong liquor are separate, may be depended on solely for the rectification of the gas or causing it to deposit its aqueous vapor. For the purpose of my invention, however, I prefer to employ a rectifier, C, in which the rectification of the gas is completed in such a manner that it can be readily controlled so as to insure the deposition and removal of almost all water.

The rectifier, which is shown in Fig. 11, consists of outer tubes $C'$, connected by headers $C^2$ and fitted in suitable stuffing-boxes, $c$, said outer tubes and headers serving for the flow of gas; and it also comprises inner tubes $C^3$ connected by return-bends $C^4$ and passing through stuffing-boxes $c'$ in the outer walls of the headers, such inner tubes forming a passage for the flow of cooling-water, which may be supplied to the bottom of the rectifier by a pipe, $c^2$, and escape therefrom by a pipe, $c^3$. The ammonia-gas escaping from the top of the analyzer or separator B by a pipe, $n$, may enter the upper header of the rectifier C, and pass successively through the several outer tubes $C'$ and headers $C^2$, escaping finally from the lower header through a pipe, $n'$, as will be hereinafter described. The gas in its passage through the tubes $C'$ is cooled and caused to deposit its aqueous vapor, and the headers $C^2$, which are at opposite ends of the tubes $C'$, alternately, are constructed with dams $c^4$ to collect the water deposited in each tube $C'$ and prevent its passing downward to the next tube. These dams $c^4$ are of semicircular form, as best shown in Figs. 12 and 13, and are provided with passages $c^5$ at opposite sides of the headers, or at one side only, if desired. With the outlet-openings $c^5$ for water communicate branch water pipes $c^6$, provided severally with valves $c^7$ and communicating with the main pipe $c^8$, leading into the top of the analyzer or separator B and delivering downward into the passage $b'$ of the upper section $B^4$ therein. The pipes $c^6$ may be connected with the water-outlets $c^5$ at either side of the headers $C^2$, as desired, and the opposite outlets may be plugged. The several branch pipes $c^6$, with the valves $c^7$, serve as a means of controlling the rectification of the gas and determining when the gas has been caused to deposit almost all of its aqueous vapor and rendered nearly anhydrous. In thus separating nearly all the water from the gas ammonia will also pass over, and what is delivered through the pipe $c^8$ to the analyzer will usually be stronger than that entering through the pipe $m$, and will be of such strength that the gas passing upward through the passage $b^4$ will be sufficiently hot to generate gas therefrom. Because of this I prefer to tap the pipe $c^8$ into the upper section $B^4$, so as to deliver the liquor therefrom into the passage $b'$, and the pipe $m$ is continued down for a little distance before it communicates with the passage $b'$. Then the hot liquor entering through the pipe $c^8$ will in its passage through several turns of the spiral passage $b'$ have gas generated from it immediately. I thus obtain the advantage of whatever gas can be generated from the liquor entering through the pipe $c^8$ by the heat of the gas escaping through the passage $b^4$ before such liquor becomes mingled with the weaker liquor entering from the pipe $m$. By closing the valves $c^7$ at intervals, and beginning from the bottom of the rectifier upward, the attendant can readily ascertain how far the rectification should be carried to take off nearly all water, and can control the flow of cooling-water through the inner tubes $C^3$ accordingly.

From the above description the advantage of completing the rectification of the gas in the rectifier independent of the analyzer or separator B, and where it can be accurately controlled, will be readily understood. The return bends C⁴ of the rectifier are provided opposite the ends of the tube C³ with cleaning-holes closed by plugs $c^9$ or otherwise, and which provide for the ready introduction of a brush or tube-cleaner in case the tubes C³ become foul with mud or other impurities.

From the bottom of the rectifier C the gas, which is nearly anhydrous, passes through the pipe $n'$ to the condenser D, the upper and lower portions of which are shown in Fig. 14, to which I will now refer. The condenser D comprises outer tubes D′, united by headers D², with which they are connected by stuffing-boxes $d$ and inner tubes D³, which are connected by return-bends D⁴ and serve for the passage of cooling-water. The headers D², as shown, receive the ends of two adjacent tubes, D′, and rest one upon another. The inner tubes D³ pass through stuffing-boxes $d'$ in the outer walls of the headers, and the return-bends D⁴ are provided opposite the tubes D³ with cleaning-holes closed by plugs $d^2$, or otherwise, and which provide for the ready introduction of a tube-brush for cleaning out the tubes D³ of any mud or any foreign matter which may deposit therein. This feature of cleaning out the tubes or passages which serve for the flow of cooling-water is very important, as the efficiency of the apparatus depends largely upon the surfaces of such tubes or passages being kept clean. The cooling-water may be supplied to the inner tubes D³ at the bottom of the condenser through a pipe, $d^3$, directly from a supply-tank, K, and from the inlet at the bottom passes through the inner system of tubes D³ to the top of the condenser, where it makes its escape. A portion of this water after passing through the condenser may be conducted through a pipe, $d^4$, which extends above the condenser and is perforated throughout its length, so as to distribute cooling-water upon the exterior of the tubes D′, and thereby add to the effect of the condenser in cooling the gas. The remainder of the water escaping from the condenser may pass by a branch pipe, $d^5$, and be conducted to the absorber H, as I shall hereinafter describe. There is always a high pressure of gas within the analyzer or separator B, the rectifier C, and the condenser D, and by the combined effect of the cooling and pressure in the condenser the gas is reduced to liquid form and escapes from the header D² at the bottom of the condenser through a pipe, $o$, to the liquid-gas receiver E. This receiver may consist simply of a strong piece of large pipe having its ends welded up and provided with a gage-glass, $e$, for indicating the level of liquid gas within it.

With the liquid-gas receiver or reservoir E is connected the float-actuated delivery-valve F. (Shown in detail in Figs. 15 and 16.) This valve comprises a casing or box, $f$, receiving liquid gas by a passage, $f'$, from the receiver E, and having a pipe, $f^2$, through which the liquid gas is delivered in small and regulated quantity as desired to the cooler, hereinafter described. The valve proper is formed by an arm, $f^3$, which is fixed upon a beam, $f^4$, fulcrumed at $f^5$, and this beam is provided at one end with a weight, $f^6$, and at the other end with a float, $f^7$. The valve proper, $f^3$, as the float $f^7$ rises and falls, moves between two opposite valve-seats, $f^8$, from which cored passages $f^9$ extend downward to the delivery-pipe $f^2$. In the pipe $f^2$ is a valve, $f^{10}$, which may be closed when desired, and the float-actuated valve $f^3$ will automatically and properly regulate the passage of liquid gas to the cooler through the pipe $f^2$.

The construction of the cooler G G′ is shown in Figs. 17 and 18. In this example of the invention the cooler comprises a system of tubes through which the gas, which instantly assumes gaseous form on entering the cooler, because of the light pressure therein, flows, and the expanding gas absorbs or renders latent the heat from brine or other liquid contained in the tank G′, and the refrigerating brine or liquid is conducted to any locality for use in making ice, or through a coil, G², for cooling the atmosphere. The cooler proper, G, comprises outer tubes G⁴, connected with headers G⁵ by suitable stuffing-boxes, $p$, and inner tubes G⁶, which are connected by return-bends G⁷ and pass through stuffing-boxes $p'$ in the outer walls of the headers. The liquid gas, which enters the bottom of the tube system through the pipe $f^2$, expands, because of the light pressure, into gaseous form, and in passing through the outer tubes G⁴ and through headers G⁵ performs its useful effect and escapes from the top of the tube system by a pipe, $n^2$, to the absorber H, as hereinafter described.

The outer tubes G⁴ and the headers G⁵ are surrounded by brine or other liquid within the tank G′. The pump G³ takes the brine from the tank G′ through a suction-pipe, $p^2$, and delivers the brine through a discharge-pipe, $p^3$, to the inner tube G⁶ at one extremity of the cooler—the top, for example. The brine circulates through the tubes G⁶ and bends G⁷, and from the other extremity of the cooler (the bottom, for example) escapes by a pipe, $p^4$, and passes to the coil G², from which it returns by a pipe, $p^5$, to the tank G′, to be again circulated by the pump.

It is advantageous to employ the double system of tubes in the cooler, because then the gas acts not only to cool the brine in the tank in which the cooler proper is immersed, but also acts to cool the brine passing through the inner tubes, and therefore has a double effect.

From the top of the cooler the spent gas passes through the pipe $n^2$ to the absorber H, which is shown in Fig. 19, and which I will now describe. This absorber comprises outer tubes H′, connected with headers H² by stuffing-boxes $h$, and inner tubes H³, passing through the headers and outer tubes and connected by return-bends H⁴, stuffing-boxes $h'$ being provided for the inner tubes H³ in the outer walls of the headers $H^2$. In the return-bends $H^4$, opposite the tubes $H^3$, are cleaning-holes closed by plugs $h^2$, or otherwise, and which provide for the ready cleaning of the tubes $H^3$ from mud or other deposit.

The cooling-water which leaves the condenser D by the pipe $d^5$ passes through the inner system of tubes $H^3$ in the absorber H, and at the upper end of the absorber has a continuation, $d^6$, which extends over the absorber parallel with its tubes, and is perforated for the distribution of the cooling-water over the outer surfaces of the tubes $H'$, thereby aiding in reducing the temperature of the weak liquor in its passage through the absorber. In lieu of the perforated pipe a water-distributer of any construction might be employed for delivering the cooling-water over the exterior of the absorber.

The weak liquor from the bottom of the generator A passes by a pipe, $o'$, to the equalizer I, which I shall soon describe, and from the equalizer is conducted by a pipe, $o^2$, to the top of the absorber H. Extending downward from the header $H^2$ at the bottom of the absorber H is a pipe or well, $H^5$, which may be filled with scraps of iron or other material. The spent gas from the cooler passes through the pipe $n^2$ to or near the bottom of the pipe or well $H^5$, and, passing up through the same, is distributed or divided. The gas ascending through the outer tubes $H'$ and headers of the absorber H meets the weak liquor as it descends through the same passages, and the weak liquor, being reduced in temperature by the cooling-water passing through the inner tubes $H^3$, greedily absorbs the spent gas, and before it reaches the bottom of the pipe or well $H^5$ becomes strong liquor, fit to be again passed through the generator. From the lower portion of the pipe or well $H^5$ of the absorber the strong liquor passes by a pipe, $o^3$, and after its passages through the equalizer I is delivered by a pipe, $o^4$, to the trap J.

The equalizer I (shown in Fig. 20) comprises outer tubes $I'$, connected with headers L by stuffing-boxes $i$ and inner tubes $L'$, connected by return-bends $L^2$ and passing through stuffing-boxes $i'$ in the outer walls of the headers L. The outer tubes $I'$, with their headers, and the inner tubes $L'$ and return-bends $L^2$ constitute two contiguous but separate passages through which the weak liquor from the generator A and the strong liquor from the absorber H are passed in opposite directions, and in such passage the weak liquor, which is hottest or of higher temperature, imparts its heat to the strong liquor, and thereby better prepares the strong liquor for its entrance to the generator or to the analyzer and the weak liquor for its introduction into the absorber H.

It is immaterial which liquor passes through the inner tube system of the equalizer; but as here represented, the weak liquor passes by a pipe, $o'$, to the upper header L of the equalizer and thence passes through the outer tubes $I'$, and is delivered from the bottom of the equalizer through the pipe $o^2$ to the absorber H. The strong liquor passes by a pipe, $o^3$, to the inner tube $L'$ at the bottom of the equalizer, and after passing through the inner tube system flows by a pipe, $o^4$, to the trap J.

The strong liquor as it passes through the pipe $o^4$ from the equalizer has but slight pressure, and it is necessary to deliver it into the analyzer or separator B, through which it passes to the generator A, against a high pressure. To perform this office automatically, and therefore render the apparatus automatic in its operation, I employ the automatic return-trap J, which may be of any construction ordinarily employed. This trap takes the strong liquor from the pipe $o^4$, and, being supplied with gas through a pipe, $n^3$, which equalizes the pressure within it with the pressure in the analyzer or separator B, it delivers the strong liquor through the pipe $m$ to the analyzer or separator B, from whence it passes downward to and through the generator.

From Figs. 8, 9, and 10 it will be seen that the sections $B^4$ of the analyzer or separator not only form the spiral passages $b'$ $b^4$, but they also form a passage, $s$, extending centrally through the analyzer or separator, and with which the passage $b^4$ at each section $B^4$ is in communication through the liquid seal or trap $b^8$ $b^9$. Consequently the water overflowing from each seal or trap $b^8$ $b^9$ escapes directly downward to the generator through the central space, $s$, without passing through the passage $b^4$ in the sections $B^4$ below.

In the generator, rectifier, condenser, cooler, absorber, and equalizer I have shown the outer tubes as connected with the headers by stuffing-boxes. They may, however, be connected with the headers by joints of other suitable construction which will prevent leakage.

It is important that in the generator shown in Fig. 2, and also in Fig. 6, the tubes should be horizontal as well as parallel, because then a uniform depth of liquor can be maintained through the whole length of the tube and the gas may escape directly and with equal freedom from the liquor throughout the whole length of the tube. It is also important to have the heat for vaporizing the ammonia supplied from an inner steam-pipe, as distinguished from an outer heating-jacket, because when the heat is supplied from an inner steam-pipe there is no outward radiation to the atmosphere, but all radiation is to the liquor which surrounds the pipe. I have in my preceding specification described that in the absorber H and also in the apparatus D the water, after being caused to flow through the inner tubes, is discharged over the outside of the outer tubes and thereby serves to modify the temperature of the gas or liquor flowing through the outer tubes. It is important that the water should be first passed through the inner tubes, and after it has become slightly warmed be distributed over the outer tubes, rather than that these steps should be reversed, because if the water is first passed through the inner tubes and then sprinkled over the outer tubes it has an opportunity of delivering its heat to the water, which it would not have if it were first sprinkled over the outer tubes and then pumped through the inner tubes.

The combination of the pump $G^3$ with the cooler G and the tank G', as herein described, is an important one and promotes the rapid and intense cooling of the brine. It will be observed that in this case the outer tubes serve for the expansion of gas, and that they absorb heat both from the brine which is in contact with their exterior and from the brine which is passed through the inner tubes. The large body of brine in a tank is more difficult to cool and slower of cooling than a small stream which is pumped through the inner tubes; hence the large body of brine in the tank is subjected to most intense cooling action, and afterward it is pumped in a small stream through the inner tubes to still further reduce the temperature. I am of course aware that a pump has been employed for taking liquor from a tank and circulating it through a system of cooling-coils and then returning it to the tank, and such apparatus is shown in the patent to Rankin, No. 316,292.

Lastly, I would remark that in a still or generator it is a matter of supreme importance that the liquor, when it is introduced into the still or generator, shall not have any opportunity of free passage through the gas space. By reference to Fig. 2 of my drawings it will be seen that the liquor which enters the cup $k^8$ from the liquid-sealed nipple $k^7$ flows directly to the upper tube A', the cup $k^8$ or well being prolonged as a conductor to the said upper tube A', and therefore the liquor supplied to the generator is conducted directly to one of its tubes and has no opportunity to flow or trickle over surfaces where it will be exposed in a thin sheet or film, or otherwise, to the action of the gas, as where the strong liquor has any opportunity to do so it is an active absorbent of the gas generated.

I am aware that many prior patents have been granted which show and describe the passage of ammonia-gas after generation through a long coil or series of connected pipes immersed in cold liquor or water for transferring the heat from the gas passing through the long passage or pipe to the surrounding liquor or water. Therefore I do not claim, broadly, a vessel having a long spiral gas passage to be surrounded by liquor, but limit my claim for the analyzer to a vessel containing two contiguous and alternated, but separate, spiral passages of substantially equal length, an inlet for strong liquor at one end of one passage, and an inlet for gas at the opposite end of the other passage. By this construction I obtain a great length of liquor-passage in contradistinction to a vessel in which the coil is immersed in a body of liquor, and this feature is very advantageous, because the coldest liquor as it enters one passage is brought under the influence of the coldest gas, and from which it can still absorb some heat. The liquor as it descends becomes warmer and is brought under the influence of warmer and warmer gas, so that by my construction the largest possible percentage of heat is transferred from the hot gas to the strong liquor.

What I claim as my invention, and desire to secure by Letters Patent, is—

1. In a generator for ammonia-gas, the combination, with a series of substantially parallel and horizontal outer tubes for strong liquor, and a header from which the tubes extend and which is constructed to afford a single upright passage with which all said tubes communicate, and which is independent of and separate from the passages for liquor, and serving for the escape of gas delivered from the several tubes without compelling its successive passage through the tubes, of a series of inner tubes connected at the ends to form a continuous passage for heating fluid and extending across the gas-passage of the header, substantially as herein described.

2. In a generator for ammonia-gas, the combination, with a series of substantially parallel and horizontal outer tubes for strong liquor, and headers $A^3$ at opposite ends of the tubes, each constructed with a free passage entirely independent of and separate from the passages for liquor, and with which all the tubes communicate, and serving for the escape of gas delivered from the several tubes without passing through the tubes in succession, of a series of inner tubes extending across the gas-passages of the headers and connected beyond the passages to form a continuous passage for heating fluid, substantially as herein described.

3. The combination, with the outer generator-tubes for strong liquor, of a header from which said tubes extend and which is constructed with dams or partitions at the ends of the tubes to control the depth of liquor in the tubes, and with supplemental dams to prevent the escape of liquor into the gas-space of the header when under violent ebullition, and steam-heating tubes extending through the outer tubes, substantially as herein described.

4. The combination, with the outer parallel and horizontal generator-tubes, of a header from which the tubes extend and which has a single open gas-passage with which all the tubes communicate, a pipe and conductor for introducing liquor to the header and for conducting the liquor to the upper tube and preventing its free passage through the gas-space, and inner heating-tubes extending through the outer tubes and across the gas space of the header, substantially as herein described.

5. The combination, with the outer parallel and horizontal generator-tubes for strong liquor, of gas-headers $A^3$ at the ends of the tubes, and each of which is constructed with cored passages for the descent of liquor from one tube to another and with a gas-passage common to all the tubes and entirely separate from and independent of any passage for liquor in the header, a pipe and conductor for introducing liquor directly to the upper tube without its free passage through the gas-space, and steam-heating tubes extending through the outer tubes and across the gas-passage of the header and connected beyond the header to form a continuous passage for steam, substantially as herein described.

6. The combination, with the outer generator-tubes A', for strong liquor, of a gas-header, A³, constructed with a main passage for gas and with dams at the end of the tubes, and steam-heating tubes extending through the outer tubes, the header being constructed with cored passages extending from the dams to its outer wall to receive through them the steam-heating tubes, substantially as herein described.

7. The separator or analyzer herein described, consisting of the upright chamber or casing containing two contiguous and alternated but separate spiral passages of substantially equal length, and serving one for the descent of strong liquor to the generator and the other for the escape of gas from the generator, in combination with an inlet for strong liquor at one end of one passage and an inlet for gas at the opposite end of the other passage, substantially as herein set forth.

8. The separator or analyzer herein described, consisting of an upright chamber or casing and a filling of intermatching sections, forming, when superposed one on another, two separate spiral passages which alternate one with the other and serve one for the descent of strong liquor to the generator and the other for the escape of gas from the generator, substantially as herein set forth.

9. The separator or analyzer herein described, consisting of an upright chamber or casing and a filling of intermatched sections, B⁴, each forming part of a spiral and having a passage cored within it, and having flanges $b^2$ $b^3$ at top and bottom, whereby the sections when superposed one on another will form two alternating but separate passages of substantially equal length, substantially as herein set forth.

10. The combination, with the separator or analyzer chamber, of the cast-metal sections B⁴, each having cast within it a portion of a spiral passage, and having flanges which enable the sections when placed one on another to form another and contiguous spiral passage, and each section having a downwardly-projecting nipple or throat, $b^8$, and an annular groove or depression, $b^9$, wherein the nipple or throat of the section next adjacent is trapped to prevent the direct upward flow of gas, substantially as herein described.

11. The combination, with the separator or analyzer chamber, of the spiral sections B⁴, arranged therein one above another and constructed, as described, so as to form contiguous but separate spiral passages, each section being provided at the lower end of its passage portion with a projecting lip, $b^6$, entering a corresponding socket or recess in the upper end of the next lower section, substantially as herein described.

12. The combination, with the separator or analyzer chamber, of spiral sections B⁴, arranged therein one above another and constructed, as described, so as to form contiguous but separate spiral passages, the upper surface of the sections being ribbed or having a serpentine or zigzag profile around their circumference, substantially as herein described.

13. The combination, with a tank for brine or other liquid to be cooled, of a cooler arranged therein and to be immersed in said liquid, and composed of a system of outer tubes and connecting-headers for expanding gas, and a system of inner tubes and connecting-bends for the liquid to be cooled, a pump for taking liquid from the tank and delivering it to the inner tube system at one end thereof, whereby the liquid after preliminary cooling in the tank is passed through the inner tube system, and pipes through which said liquid is conducted from the other end of the inner tube system and after performing useful effect in cooling is returned to said tank, substantially as herein described.

14. In an ammonia refrigerating apparatus, the combination, with a generator wherein gas is generated by heat and an absorber wherein the weak liquor is made to absorb the spent gas, of an automatic trap for returning strong liquor from the absorber to the generator, and a pipe for conducting gas to the trap for producing its operation, substantially as herein described.

RAYMOND F. ROSWALD.

Witnesses:
 WM. C. MUNROE,
 C. HALL.